(12) United States Patent
Otani (10) Patent No.: US 12,319,077 B2
(45) Date of Patent: Jun. 3, 2025

(54) PRINTED BASE MATERIAL AND METHOD FOR PRODUCING THE SAME

(71) Applicant: OTSUKA PHARMACEUTICAL FACTORY, INC., Tokushima (JP)

(72) Inventor: Shingo Otani, Tokushima (JP)

(73) Assignee: OTSUKA PHARMACEUTICAL FACTORY, INC., Tokushima (JP)

( * ) Notice: Subject to any disclaimer, the term of this patent is extended or adjusted under 35 U.S.C. 154(b) by 0 days.

(21) Appl. No.: 18/024,112

(22) PCT Filed: Sep. 1, 2021

(86) PCT No.: PCT/JP2021/032206
§ 371 (c)(1),
(2) Date: Mar. 1, 2023

(87) PCT Pub. No.: WO2022/050324
PCT Pub. Date: Mar. 10, 2022

(65) Prior Publication Data
US 2023/0271442 A1 Aug. 31, 2023

(30) Foreign Application Priority Data
Sep. 3, 2020 (JP) ................................. 2020-148006

(51) Int. Cl.
*B41M 5/00* (2006.01)
*C09D 11/32* (2014.01)
*C09D 11/40* (2014.01)

(52) U.S. Cl.
CPC ........ *B41M 5/0064* (2013.01); *B41M 5/0047* (2013.01); *C09D 11/32* (2013.01); *C09D 11/40* (2013.01)

(58) Field of Classification Search
CPC ...... C09D 11/40; C09D 11/32; B41M 5/0047; B41M 5/0064
See application file for complete search history.

(56) References Cited

U.S. PATENT DOCUMENTS

| | | |
|---|---|---|
| 2005/0095379 A1 | 5/2005 | Hayakawa et al. |
| 2006/0055948 A1* | 3/2006 | Ozaki ................. B41F 33/0045 358/1.9 |
| 2006/0158495 A1 | 7/2006 | Okubo |
| 2009/0136726 A1* | 5/2009 | Ishii ....................... B32B 27/08 428/212 |

(Continued)

FOREIGN PATENT DOCUMENTS

| | | |
|---|---|---|
| CN | 1608097 | 4/2005 |
| CN | 1816454 | 8/2006 |

(Continued)

OTHER PUBLICATIONS

International Search Report (ISR) issued Nov. 16, 2021 in International (PCT) Application No. PCT/JP2021/032206.

(Continued)

*Primary Examiner* — David H Banh
(74) *Attorney, Agent, or Firm* — Wenderoth, Lind & Ponack, L.L.P.

(57) ABSTRACT

A printed base material includes a printed area on a base material. The printed area includes a differently colored printed area having different colors separated by a clearance.

26 Claims, 3 Drawing Sheets

(56) References Cited

U.S. PATENT DOCUMENTS

| | | | | |
|---|---|---|---|---|
| 2011/0012980 A1* | 1/2011 | Stowe | ............... | B41J 2/0057 |
| | | | | 347/221 |
| 2014/0070464 A1* | 3/2014 | Lin | ............... | B29C 48/0018 |
| | | | | 264/448 |
| 2014/0292851 A1* | 10/2014 | Toya | ............... | B41J 2/2114 |
| | | | | 347/9 |
| 2014/0292865 A1* | 10/2014 | Toya | ............... | B41J 2/2114 |
| | | | | 347/14 |
| 2016/0236378 A1* | 8/2016 | Croughwell | ......... | A01K 15/025 |
| 2016/0368683 A1* | 12/2016 | Bazbaz | ................. | B65D 31/02 |
| 2017/0282548 A1 | 10/2017 | Shikata | | |
| 2019/0160842 A1 | 5/2019 | Ueda | | |
| 2019/0308786 A1* | 10/2019 | Okamoto | ............. | B65D 65/40 |
| 2020/0039232 A1 | 2/2020 | Asakawa et al. | | |
| 2020/0048445 A1* | 2/2020 | Shibayama | ......... | C08K 5/3475 |
| 2021/0316540 A1* | 10/2021 | Yamasaki | ............. | B32B 25/16 |

FOREIGN PATENT DOCUMENTS

| | | |
|---|---|---|
| JP | 6-135015 | 5/1994 |
| JP | 6-347637 | 12/1994 |
| JP | 8-52932 | 2/1996 |
| JP | 8-216389 | 8/1996 |
| JP | 9-277569 | 10/1997 |
| JP | 2002-292848 | 10/2002 |
| JP | 2006-181251 | 7/2006 |
| JP | 2008-094107 | 4/2008 |
| JP | 2009-196094 | 9/2009 |
| JP | 2010-172575 | 8/2010 |
| JP | 2014-188806 | 10/2014 |
| JP | 2017-132946 | 8/2017 |
| JP | 2017-185655 | 10/2017 |
| JP | 2018-141066 | 9/2018 |
| JP | 2019-018504 | 2/2019 |
| JP | 2020-19180 | 2/2020 |

OTHER PUBLICATIONS

International Preliminary Report on Patentability issued Mar. 7, 2023 in International (PCT) Patent Application No. PCT/JP2021/032206.

Zhang, "Digital Printing Principle and Technology", Jun. 30, 2007, China Light Industry Press.

Li Luhai, Coating Composite Technology, Jun. 30, 2011, pp. 240 & 241, with English translation of the Abstract.

* cited by examiner

PRINTED BASE MATERIAL AND METHOD FOR PRODUCING THE SAME

TECHNICAL FIELD

The present invention relates to a novel printed base material and the like.

BACKGROUND ART

Various printing methods (image recording methods) have been known. For example, ink-jetting is a printing method (printing system) of ejecting microscopic ink drops to print (record or form) images.

Various inks have been used for such ink-jetting depending on printing performance, types and coating performances of a printing base material, and the like (for example, JP 2017-132946).

SUMMARY OF INVENTION

Technical Problem

An object of the present invention is to provide a novel printed base material and a method for producing the printed base material.

As described above, various printing methods have been known, but when different color inks are adjacently used (without clearance) to print images, the inks are mixed between the adjacent colors (in the boundary between the different colors) to cause bleeding (color mixing) in some cases.

According to studies by the inventors of the present invention, the bleeding between different colors is likely to be caused particularly by ink-jetting or a similar printing method in which inks are ejected as dots to print (record) images, and is markedly observed specifically when printing is performed on a base material having no or low absorbability (liquid absorbability) (for example, a plastic film), when an aqueous ink is used, or when a color ink and a clear ink are layered in printing, for example.

In the printing, different color inks are adjacent, but are certainly dotted at positions not overlapping with each other, and such a bleeding problem is extremely difficult to solve.

Solution to Problem

In such circumstances, the inventors of the present invention have carried out intensive studies and consequently have found that when different color inks are adjacently used to print images, the bleeding between the adjacent different colors can be efficiently reduced by printing in such a way as to forma clearance between the different colors. After further studies, the present invention has been accomplished.

In other words, the present invention relates to the following.

[1]
A printed base material comprising a printed area on a base material, wherein the printed area comprises (at least) a differently colored printed area having different colors separated by a clearance.

[2]
A printed base material comprising a printed area on a base material, wherein the printed area comprises at least a differently colored printed area, wherein adjacently printed different colors have no bleeding.

[3]
The printed base material according to the above [1] or [2], wherein the base material comprises a printing face having a wetting tension of 30 to 50 dyn/cm.

[4]
The printed base material according to anyone of the above [1] to [3], wherein the base material is a plastic film.

[5]
The printed base material according to any one of the above [1] to [4], wherein the printing face of the base material comprises a polyester resin.

[6]
The printed base material according to any one of the above [1] to [5], wherein the printed area is printed by ink-jetting.

[7]
The printed base material according to any one of the above [1] to [6], wherein the printed area is formed from an aqueous ink.

[8]
The printed base material according to any one of the above [1] to [7], wherein the printed area is formed from a color ink and a clear ink.

[9]
The printed base material according to any one of the above [1] to [8], wherein the printed area is formed from an aqueous color ink and an aqueous clear ink.

[10]
The printed base material according to any one of the above [1] to [9], wherein the printing area comprises a resin and a coloring agent, and wherein the resin is contained in an amount of 20% by mass or more relative to the total amount of the resin and the coloring agent.

[11]
The printed base material according to any one of the above [1] to [10], wherein the clearance has a width of 10 to 1,500 μm.

[12]
The printed base material according to any one of the above [1] to [11], wherein the differently colored printed area comprises a differently colored printed area having a first color and a second color, wherein the first color or the second color has a width A (μm) and the clearance has a width B (μm), and wherein the ratio of B/A is 8 or less.

[13]
The printed base material according to any one of the above [1] to [12], wherein the differently colored printed area comprises a differently colored printed area having a printing resolution X (dpi), wherein the clearance has a width corresponding to pixels Y, and wherein the ratio of X/Y is 20 to 800.

[14]
The printed base material according to any one of the above [1] to [13], wherein the differently colored printed area comprises a differently colored printed area 1 having a first color and a second color, wherein the first color or the second color has a width of 500 μm or less, wherein the differently colored printed area 1 has a printing resolution X (dpi) and has a clearance having a width corresponding to pixels Y, and wherein the ratio of X/Y is 50 or more.

[15]
The printed base material according to the above [14], wherein the first color or the second color has a width of 400 μm or less and the ratio of X/Y is 100 or more in the differently colored printed area 1.

[16]
The printed base material according to any one of the above [1] to [15], wherein the differently colored printed area comprises a differently colored printed area 2 having a first color and a second color, wherein the first color or the second color has a width of more than 500 μm, wherein the differently colored printed area 2 has a printing resolution X (dpi) and has a clearance having a width corresponding to pixels Y, and wherein the ratio of X/Y is 200 or less.

[17]

The printed base material according to the above [16], wherein the first color or the second color has a width of 600 μm or more and the ratio of X/Y is 150 or less in the differently colored printed area 2.

[18]

The printed base material according to any one of the above [1] to [17], wherein the differently colored printed area comprises the differently colored printed area 1 according to the above [14] or [15] and the differently colored printed area according to the above [16] or [17].

[19]

The printed base material according to any one of the above [1] to [18], wherein the differently colored printed area comprises a differently colored printed area having different colors containing white color.

[20]

The printed base material according to anyone of the above [1] to [19], wherein the differently colored printed area comprises a differently colored printed area having a first color and a second color, wherein the first color is in a pattern, and the second color serves as a background.

[21]

The printed base material according to any one of the above [1] to [20], wherein the differently colored printed area comprises a differently colored printed area having a first color and a second color, wherein the first color forms a bar code or a two-dimensional code, and the second color serves as a background, and wherein the differently colored printed area is capable of being recognized as a bar code or a two-dimensional code.

[22]

The printed base material according to any one of the above [1] to [21] for use in the formation of a soft bag for medical use (for example, an infusion bag).

[23]

A method for producing the printed base material according to any one of the above [1] to [22], the method comprising at least printing a printed area on a base material, wherein a differently colored printed area is printed while providing a clearance between different colors.

[24]

A method for reducing or preventing bleeding between different colors adjacently printed in a differently colored printed area in a printed area on a printed base material, the method comprising printing the printed area on a base material, wherein the differently colored printed area is printed while providing a clearance between the different colors.

[25]

The method according to the above [23] or [24], wherein the printing is performed by ink-jetting.

[26]

The method according to any one of the above [23] to [25], wherein the printing is performed by ejecting a color ink and a clear ink.

[27]

The method according to any one of the above [23] to [26], wherein the printing is performed to provide a clearance having a width of 10 to 1,500 μm.

[28]

The method according to any one of the above [23] to [27], wherein the different colors comprises a first color and a second color, wherein the first color or the second color has a width A (μm) and the clearance has a width B (μm), and wherein the clearance is provided such that the ratio of B/A is 8 or less.

[29]

The method according to any one of the above [23] to [28], wherein the differently colored printed area has a printing resolution X (dpi), and the clearance has a width corresponding to pixels Y, and wherein the clearance is provided such that the ratio of X/Y is 20 to 800.

[30]

A molded article of the printed base material according to any one of the above [1] to [22].

[31]

The molded article according to the above [30], wherein the molded article is a soft bag for medical use.

Advantageous Effects of Invention

According to the present invention, for example, a novel printed base material and a novel method for producing the printed base material are provided. The printed base material or the production method enables efficient prevention (or reduction) of bleeding between different colors.

Advantageously, the printed base material or the method does not cause deterioration of visibility or design by bleeding even when different colors are adjacently printed (different color inks are adjacently used for printing). In particular, when the printed base material is used as a package of a pharmaceutical product, the reduction of bleeding prevents the deterioration of visibility, and this can prevent medical accidents such as drug mix-ups.

DESCRIPTION OF EMBODIMENTS

Printed Base Material

A printed base material comprises a printed area (a coating, a coated film) on a base material. In other words, a printed base material comprises a base material and a printed area formed (provided) on the base material.

The printed area has at least a printed area (differently colored printed area) in which different colors are printed, and the present invention is characterized by such a differently colored printed area.

In other words, in a first aspect of the present invention, different colors are adjacently printed (with no clearance) with no bleeding in the differently colored printed area. As mentioned above, when different colors are adjacently printed, bleeding may occur between the adjacent different colors. In the first aspect, different colors are adjacently printed with no bleeding.

In a second aspect of the present invention, the differently colored printed area has different colors separated by a clearance (a gap) (a clearance is formed between the different colors).

In the second aspect, a clearance is formed between the different colors, and thus no bleeding (color mixing) generally occurs between the different colors as with the first aspect.

The printed base materials according to the first aspect and the second aspect of the present invention can be efficiently produced typically by printing in such a way as to form a clearance between different colors.

Through the printing, a clearance set at the time of the printing is reflected in the differently colored printed area, and accordingly the differently colored printed area having a clearance between different colors (the differently colored printed area in the second aspect) are formed.

Meanwhile, even when printing is performed so as to form a clearance (printing is set to provide a clearance), different color inks may slightly spread to each other depending on types of a base material, types of inks, printing methods, and the like.

In such a case, by controlling the clearance size and adjusting the clearance size (width) to the spread size (width), different color inks spread toward each other but cause no bleeding, and accordingly the differently colored printed area having no (apparent) clearance between the different colors is formed (the differently colored printed area in the first aspect).

Hence, the first aspect is also considered as a special aspect of the second aspect (an aspect in which a clearance set at the time of printing is not (apparently) reflected in the differently colored printed area, and no bleeding occurs).

The present invention will be described in further detail below.

Base Material

Examples of the base material (the recording medium, the medium to be printed) include a plastic base material, a metal base material, a wood base material, and a paper base material, and the base material may be a combination base material thereof.

Examples of the plastic include polyester resins (such as polyethylene terephthalate and polybutylene terephthalate), polycarbonate resins, olefinic resins (such as polyethylene, polypropylene, and a cyclic olefinic resin), halogen-containing resins (such as polyvinyl chloride), acrylic resins, styrenic resins, and polyamide resins.

The type of such a base material (raw material) can be selected according to applications, handling, productivity, printability, or the like. For example, the polyester resin can be suitably used in the view of printability, high-speed bag manufacturing performance (high-speed sealing performance), and the like.

The base material may have any shape of a one-dimensional shape (for example, a rod-like shape), a two-dimensional shape (for example, a film- or sheet-like shape), a three-dimensional shape (for example, various molded articles), and the like and may be typically a film- or sheet-like shape.

The film-like base material may be a stretch film.

The film-like base material may also be a laminated film or may be a bag-like film (a tubular film, a tube film, a blown film), for example.

The base material may be a coated base material (for example, a coated paper) or a surface treated (for example, corona discharge treated or plasma treated) base material.

Such a treatment may be performed at least on a printing part of the base material (a recording part, a part in which a printed area is to be formed, for example, a printing face of a film-like base material) (hereinafter, the same is applied to the characteristics, physical properties, and the like of a base material).

The base material may be transparent depending on a raw material thereof.

The base material typically includes a plastic film (especially, a transparent plastic film).

The base material may be colored or colorless.

In particular, the base material (a printing face of the base material, a part in which a printed area is to be formed) may have low or no liquid absorbability (specifically low or no water absorbability). In the present invention, the differently colored printed area having no bleeding between different colors (or having a clearance) can be efficiently formed even on such a base material.

The base material (a printing face of the base material, a part in which the differently colored printed area is to be formed) may have a wetting tension of, for example, 25 to 55 dyn/cm, preferably 28 to 52 dyn/cm, and more preferably about 30 to 50 dyn/cm (for example, 32 to 45 dyn/cm, 33 to 42 dyn/cm).

The wetting tension can be determined, for example, in accordance with JIS K6768. As the wetting reagent, for example, wetting tension test mixtures (FUJIFILM Wako Pure Chemical Corporation, etc.) or Dyne Pens for wettability test (enerdyne series, Enercon GmbH, etc.) can be used.

In a specific method, for example, the tip of a swab or the like is immersed in a wetting tension test mixture, and the swab is used to wet the surface of a material to be printed. A series of different mixtures is used to examine whether a mixture spreads to some extent even after about 2 seconds in a region or a mixture is repelled in a region.

The wetting tension may relate to the wettability of an ink used for printing and eventually to easy printing (recording), but a larger wettability causes color mixing (bleeding) between the adjacent colors with a higher probability. In the present invention, sufficiently easy printing (appropriate wettability) and bleeding prevention (reduction) can be efficiently satisfied.

Ink

The printed area (differently colored printed area) is typically formed from inks (ink compositions).

When inks containing volatile components (solvent components) are used, the resulting printed area (differently colored printed area) comprises ink components except the volatile components that have volatilized (evaporated), that is, solid components (coloring agents, resins, etc. as described later) of the inks.

The ink can include at least color inks, and other inks (such as a clear ink) may be used in combination as needed.

Color Ink

The color ink contains a coloring agent (coloring material) that can be any of white coloring agents and non-white coloring agents (such as yellow, cyan, magenta, black, gray, red, orange, and green coloring agents).

In particular, the colors constituting the differently colored printed area may include at least a white coloring agent. When the different colors constituting the differently colored printed area include white color (and the base material is particularly transparent), a clearance provided in the differently colored printed area may be unlikely to be visually observed (unlikely to be noticed), and bleeding can be naturally prevented without accentuation of the clearance.

As the coloring agent, for example, a dye or a pigment is used, and a pigment may be suitably used. The pigment may be any of inorganic pigments and organic pigments.

Examples of the inorganic pigment include metal compounds (such as titanium oxide, basic lead carbonate, zinc sulfide, iron oxide, colcothar, and chromium oxide) and carbon blacks (such as furnace black, acetylene black, and channel black).

Examples of the organic pigment include azo pigments (such as an azo lake pigment), phthalocyanine pigments, perylene pigments, perinone pigments, anthraquinone pigments, quinacridone pigments, dioxazine pigments, thioindigo pigments, isoindolinone pigments, and diketopyrrolopyrrole pigments.

The coloring agent may have any color index (C.I.). Examples of the color index of the white pigment include C.I. Pigment Whites 1 (basic lead carbonate), 4 (zinc oxide), 5 (mixture of zinc sulfide and barium sulfate), 6 (titanium oxide), 6:1 (titanium oxide containing other metal oxides), 7 (zinc sulfide), 18 (calcium carbonate), 19 (clay), 20 (mica titanium), (barium sulfate), 22 (natural barium sulfate), 23 (gloss white), 24 (alumina white), 25 (gypsum), 26 (magnesium oxide/silicon oxide), 27 (silica), and 28 (anhydrous calcium silicate).

The coloring agent (pigment) may be surface-treated (a self-dispersible pigment) or dispersed in a dispersant (such as a surfactant and a resin) (a dispersed pigment).

The color ink may contain typically a resin (a resin component). The resin can be used for abrasion resistance, adhesiveness, or other properties of a coating (coated film).

Examples of the resin include acrylic resins, styrene acrylic resins, styrenic resins, vinyl carboxylate resins (such as a vinyl acetate resin), olefinic resins, rosin-modified resins, terpene resins, diene resins (such as a butadiene resin), halogen-containing resins (such as a vinyl chloride resin), polyester resins, urethane resins (a polyurethane resin), polyamide resins, and epoxy resins.

If a resin can be formed into a coating [for example, a reaction (such as polymerization or condensation) can proceed during drying of a coating to form a polymer or cross-linkages], a component as a resin precursor or a prepolymer (such as a polyisocyanate compound and a polyol compound) can also be used as the resin (resin component).

The resins may be used singly or in combination of two or more of them.

The resin may have a functional group (reactive group). Examples of the functional group include acid groups (such as a carboxy group), an amino group, a hydroxy group, a mercapto group, an epoxy group, an isocyanate group, a carbodiimide group, and an oxazoline group.

The resin may have a single functional group or two or more functional groups.

Such a functional group can contribute, for example, to cross-linking of an ink (coating) used for printing.

The resin may be in any form, particularly may be in a particle (resin particle) form, and typically may be such resin emulsion particles (resin particles constituting an emulsion). These emulsion particles may contain a dispersant (surfactant).

The color ink may have cross-linkability. A color ink having cross-linkability can form a more robust coated film (print coated film).

The cross-linkability can be imparted to a color ink, for example, by using, as the resin, a resin having at least a functional group and by adding, to the color ink, a component (cross-linking agent) reactive and cross-linkable with the functional group or by adding, to the color ink, a cross-linking agent reactive with a resin contained in the clear ink described later.

The cross-linking agent (cross-linkable component) can be appropriately selected, for example, according to the type of the functional group of a resin contained in a color ink and/or a resin contained in a clear ink.

For example, when the functional group is a carboxyl group or a similar group, a cross-linking agent having a reactive group (such as an isocyanate group, an epoxy group, a carbodiimide group, and an oxazoline group) with the carboxyl group can be used.

The functional group or the reactive group (or a cross-linking agent) may be protected (blocked) in an ink (an ink before printing) as long as the group can form cross-linkages in a coated film. In such a case, the functional group or the reactive group is deprotected and forms cross-linkages in a coated film.

In the printed area (differently colored printed area), the cross-linking agent (cross-linkable component) forms cross-linkages in a resin or constitutes a resin.

The color ink may contain a dispersant, a surfactant, an antifoaming agent, a dissolution aid, a viscosity modifier, a pH adjuster, an antioxidant, an antiseptic agent, an antifungal agent, a corrosion inhibitor, and other additives. These additives may be contained singly or in combination of two or more of them in the color ink.

The color ink may be any of oil color inks and aqueous color inks, and an aqueous ink (water-base ink) can be suitably used in the view of the environment or the like. The aqueous inks, which are likely to need a longer drying time, are likely to cause bleeding between different colors (likely to cause marked bleeding at the time of printing especially on such a base material as a plastic film), but in the present invention, the bleeding between different colors can be efficiently reduced even when aqueous inks are used.

The solvent contained in the color ink can be appropriately selected according to classification such as an oil ink and an aqueous ink.

For example, the solvent contained in the aqueous ink may comprise at least water and, as needed, may comprise an organic solvent (water-soluble organic solvent).

Examples of the organic solvent include alcohol solvents, ether solvents, nitrogen-containing solvents (for example, chain amide solvents such as N,N-dimethylformamide and N,N-dimethylacetamide; cyclic amide solvents such as 2-pyrrolidone, N-methyl-2-pyrrolidone, and 2-oxazolidone; and urea derivatives such as 1,3-dimethyl-2-imidazolidinone and 1,1,3,3-tetramethylurea), and sulfuric solvents (such as dimethyl sulfoxide and sulfolane).

Examples of the alcohol solvent include monools (for example, alkanols such as methanol, ethanol, n-propyl alcohol, isopropyl alcohol, n-butanol, 2-butanol, t-butanol, isobutanol, n-pentanol, 2-pentanol, 3-pentanol, and t-pentanol), polyols (for example, alkanediols such as ethylene glycol, propylene glycol, 1,3-propanediol, 1,2-butanediol, 1,2-pentanediol, 1,2-hexanediol, 1,4-butanediol, 1,5-pentanediol, and 1,6-hexanediol; polyalkanediols such as diethylene glycol, dipropylene glycol, and triethylene glycol; and aliphatic polyols including aliphatic polyols having three or more hydroxyl groups, such as glycerol).

Examples of the ether solvent include mono- to polyethers of polyols (for example, the polyols exemplified above) [for example, alkanediol monoalkyl ethers such as ethylene glycol monoisopropyl ether, ethylene glycol mono-n-butyl ether, ethylene glycol mono-t-butyl ether, propylene glycol monomethyl ether, propylene glycol monoethyl ether, propylene glycol mono-t-butyl ether, propylene glycol mono-n-propyl ether, propylene glycol monoisopropyl ether, and propylene glycol mono-n-butyl ether; polyalkanediol monoalkyl ethers such as diethylene glycol mono-n-propyl ether, diethylene glycol monoisopropyl ether, diethylene glycol mono-n-butyl ether, triethylene glycol monobutyl ether, diethylene glycol mono-t-butyl ether, dipropylene glycol mono-n-butyl ether, dipropylene glycol mono-n-propyl ether, and dipropylene glycol monoisopropyl ether; and polyol polyalkyl ethers (for example, polyalkanediol dialkyl ethers) such as diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, and tripropylene glycol dimethyl ether].

These organic solvents may be used singly or in combination of two or more of them.

In the color ink, the percentage of each component can be appropriately selected according to printing methods (for example, ejecting performance in ink-jetting), the viscosity of an ink, or the like.

For example, in the color ink, the percentage of the coloring agent may be, for example, 0.1% by mass or more (for example, 0.5 to 30% by mass), preferably 1% by mass or more (for example, 1.5 to 20% by mass), and more preferably 2% by mass or more (for example, 3 to 15% by mass).

In the color ink, the percentage of the resin (resin component) may be, for example, 0.1% by mass or more (for example, 0.5 to 30% by mass), preferably 1% by mass or more (for example, 1.5 to 20% by mass), and more preferably 2% by mass or more (for example, 3 to 15% by mass).

In a color ink containing a cross-linking agent, the percentage of the cross-linking agent varies with the type thereof, the amount of a resin, or the like and may be, for example, 0.01% by mass or more (for example, 0.05 to 10% by mass), preferably 1% by mass or more (for example, 0.1 to 5% by mass), and more preferably 0.3% by mass or more (for example, 0.5 to 3% by mass).

In the color ink, the percentage of the solvent can be appropriately selected according to the viscosity and formulation of the ink or the like.

For example, in an aqueous ink, the percentage of water may be, for example, 20% by mass or more (for example, 30 to 90% by mass), preferably 40% by mass or more (for example, 45 to 80% by mass), and more preferably 50% by mass or more (for example, 50 to 75% by mass).

In an aqueous ink containing an organic solvent (water-soluble organic solvent), the percentage of the water-soluble organic solvent may be, for example, 1% by mass or more (for example, 3 to 60% by mass), preferably 5% by mass or more (for example, 8 to 50% by mass), and more preferably 10% by mass or more (for example, 15 to 40% by mass).

The viscosity of the color ink at 32° C. may be, for example, 1 to 80 m·Pas, preferably 2 to 50 m·Pas, and more preferably about 3 to 30 m·Pas.

The viscosity can be determined, for example, with a viscometer (such as a cone-plate viscometer, a Brookfield viscometer, and an Ubbelohde viscometer) or with a capillary rheometer.

Clear Ink

The color ink may be used in combination with a clear ink. The combination enables formation of a printed area (differently colored printed area) of the color ink and the clear ink (an ink set of the color ink and the clear ink).

The clear ink may be used for any purposes, and a purpose can be an increase in the percentage of a resin in the whole inks (or in the printed area) (or in the ratio of a resin to a coloring agent). When printing is performed specifically on such a base material as a plastic film, an increase in the amount of a resin facilitates efficient formation of a printed area having excellent abrasion resistance, adhesiveness, or other properties.

To simply increase the resin ratio, the resin amount in the color ink might be increased, but this could increase the viscosity of the ink to impair ejection performance in ink-jetting, for example, unfortunately.

To overcome such a problem, a clear ink may be suitably used in the view of efficient printing or the like.

The clear ink typically contains a resin (resin component). Examples of the resin include the above-exemplified resins (such as acrylic resins, styrene acrylic resins, and urethane resins), and the resin may have such a functional group as described above.

The clear ink may have cross-linkability, which is the same as above. For example, the clear ink may contain a cross-linking agent (for example, the above-exemplified components), and the cross-linking agent may be reacted with a resin (for example, a resin having a functional group) contained in the clear ink and/or a resin (a resin having a functional group) contained in the color ink.

The clear ink may typically contain no coloring agent (coloring material).

The clear ink may also contain a dispersant, a surfactant, an antifoaming agent, a dissolution aid, a viscosity modifier, a pH adjuster, an antioxidant, an antiseptic agent, an antifungal agent, a corrosion inhibitor, and other additives.

The clear ink may be any of oil clear inks and aqueous clear inks, and an aqueous ink (water-base ink) can be suitably used. In particular, both the color ink and the clear ink are preferably oil inks or aqueous inks, and typically, both the color ink and the clear ink can be aqueous inks.

By using the clear ink as described above (or using an aqueous clear ink), the bleeding between different colors could be more likely to be caused probably because a solvent (particularly water) is used in a larger amount at the time of printing (accordingly the drying time is prolonged) as compared with when only the color ink is used, but in the present invention, the bleeding can be efficiently reduced even when the clear ink is used (or an aqueous clear ink is used).

The solvent contained in the clear ink can be appropriately selected according to classification such as an oil ink and an aqueous ink.

For example, the solvent contained in the aqueous ink may comprise at least water and, as needed, may comprise an organic solvent (water-soluble organic solvent).

Examples of the water-soluble organic solvent include the above-exemplified organic solvents (such as alcohols and ethers).

In the clear ink, the percentage of the resin (resin component) may be, for example, 0.1% by mass or more (for example, 0.5 to 30% by mass), preferably 1% by mass or more (for example, 1.5 to 20% by mass), and more preferably 2% by mass or more (for example, 3 to 15% by mass).

In a clear ink containing a cross-linking agent, the percentage of the cross-linking agent varies with the type thereof, the amount of a resin, or the like and may be, for example, 0.01% by mass or more (for example, 0.05 to 10% by mass), preferably 1% by mass or more (for example, 0.1 to 5% by mass), and more preferably 0.3% by mass or more (for example, 0.5 to 3% by mass).

In the clear ink, the percentage of the solvent can be appropriately selected according to the viscosity and formulation of the ink or the like.

For example, in an aqueous ink, the percentage of water may be, for example, 20% by mass or more (for example, 30 to 90% by mass), preferably 40% by mass or more (for example, 45 to 80% by mass), and more preferably 50% by mass or more (for example, 50 to 75% by mass).

In an aqueous ink containing an organic solvent (water-soluble organic solvent), the percentage of the water-soluble organic solvent may be, for example, 1% by mass or more (for example, 3 to 60% by mass), preferably 5% by mass or more (for example, 8 to 50% by mass), and more preferably 10% by mass or more (for example, 15 to 40% by mass).

The viscosity of the clear ink at 32° C. may be, for example, 1 to 80 m·Pas, preferably 2 to 50 m·Pas, and more preferably about 3 to 30 m·Pas.

The viscosity can be determined, for example, with a viscometer (such as a cone-plate viscometer, a Brookfield viscometer, and an Ubbelohde viscometer) or with a capillary rheometer.

Printed Area and Differently Colored Printed Area

The printed base material, as mentioned above, comprises a printed area on a base material, and the printed area comprises at least a differently colored printed area.

In the printed area (differently colored printed area), the percentage of the resin (resin component) relative to the total amount of the resin (resin component) and the coloring agent can be appropriately selected according to the type of a base material, the coating performance, or the like and may be, for example, 10% by mass or more, preferably 20% by mass or more, more preferably 30% by mass or more, and particularly 50% by mass or more.

The upper limit of the percentage of the resin to the total amount of the resin and the coloring agent may be, for example, 95% by mass, 90% by mass, 85% by mass, 80% by mass, 75% by mass, or 70% by mass.

Specific examples of the percentage of the resin (resin component) to the total amount of the resin (resin component) and the coloring agent include 10 to 95% by mass, 30 to 90% by mass, and 50 to 80% by mass.

A cross-linking agent is to react with a resin or the like, and thus when the cross-linking agent is used to form the printed area, the cross-linking agent is also included in the resin in the printed area.

By adding a sufficient amount of a resin to a printed area, a robust coating (printed area) can be efficiently formed also on such a base material as a plastic film, as described above, To increase the resin amount, a clear ink is preferably used as described above. In the present invention, the bleeding between different colors can be efficiently reduced as described above even when such a clear ink is used.

The printed area may be printed particularly as dots by a certain printing method. Such a printed area can be typically formed by ink-jetting.

When printing is performed as dots by ink-jetting or a similar method, the dots may be reflected in a printed area (differently colored printed area) [the printed area (differently colored printed area) may be formed as dots (the printed area may comprise dots)], or some or all of the dots may collapse.

Depending on the type of an ink (for example, whether a clear ink is used or not, whether an aqueous ink is used or not), resolutions, or the like, even when dots are printed, the adjacent dots (or a dot and an ink ejected thereon) may be mixed, and the dots may greatly collapse (for example, no dots are apparently observed). In the present invention, the bleeding between different colors can be efficiently reduced even when bleeding is likely to be caused as above.

The dot density (resolution) can be appropriately selected according to an intended printed area, may be selected, for example, from a range of 50 dpi or more, and may be 100 dpi or more, preferably 200 dpi or more, and more preferably 300 dpi or more.

The upper limit of the resolution may be, for example, 1,200 dpi, 1,000 dpi, 800 dpi, or 600 dpi.

Specific examples of the resolution include 50 to 1,200 dpi, 200 to 1,000 dpi, and 300 to 800 dpi.

As described above, a higher resolution causes bleeding with a higher probability, but in the present invention, the bleeding between different colors can be efficiently reduced even at a relatively high resolution.

The resolution may be constant or varying in the whole region of the printed area. For example, the resolution may be constant or varying between the printing direction (longitudinal direction) and the direction orthogonal to the printing direction (transverse direction).

When a clear ink is used and is printed (ejected) at the same positions (dots) as a color ink, the dots of the color ink may be the same as or different from the dots of the clear ink (for example, the dots of the clear ink may at least overlap with the dots of the color ink).

In the differently colored printed area, different colors are adjacently printed (or are separated by a clearance).

The width (size) of each colored area of the different colors can be variously selected from a small value to a large value according to an intended printed area. For example, the width (length) of the colored areas of different colors in different directions may be, for example, more than 500 μm (a colored area having a relatively large width, for example, 550 μm or more, 600 μm or more, 800 μm or more, 1,000 μm or more, 2,000 μm or more, or 10,000 μm or more) and may be 500 μm or less (a colored area having a relatively small width, for example, 480 μm or less, 450 μm or less, 400 μm or less, 350 μm or less, 300 μm or less, 250 μm or less, 200 μm or less, 150 μm or less, or 100 μm or less).

The upper limit of the width of the colored area is not specifically limited, can be appropriately selected according to an intended purpose of use of the printed base material or the like, and may be for example, 50,000 μm, 30,000 μm, 10,000 μm, 8,000 μm, 5,000 μm, 4,000 μm, or 3,000 μm.

The lower limit of the width of the colored area can also be appropriately selected according to an intended purpose of use of the printed base material or the like and may be, for example, 10 μm, 20 μm, 30 μm, 50 μm, 80 μm, or 100 μm.

Specific ranges of the width of the colored area include appropriate combinations of the above lower limits and the upper limits and, for example, 100 to 10,000 μm.

Different colored areas may have the same width or different widths. A specific example in which the adjacent different colored area are a first color and a second color will be described. The first color and the second color may have the same width or different widths (for example, each of the first color and the second color has a width of more than 500 μm or not more than 500 μm, but when having different widths, the first color has a width of more than 500 μm, and the second color has a width of not more than 500 μm).

As described later, when one of the different colors (for example, the first color) is in a pattern, and the other (for example, the second color) serves as a background, the color width cannot be definitely determined, or the other color may have a much larger width than that of the one color. In such a case, the width of one noticeable color (for example, the first color), the smaller width of them (for example, the width of the first color), or the width of a color that forms a pattern can be used (to control various conditions) in the view of the effect on noticeability of a clearance. When the color width varies (for example, when a pattern has varying widths, or when a color serves as a background), the smallest width can be the color width.

In the differently colored printed area in the second aspect, the width (the width in the different color direction) of the clearance (the clearance between different colors) may be selected, for example, from a range of about 2,000 μm or less, may be 1,500 μm or less, preferably 1,000 μm or less, and more preferably about 800 μm or less (for example, 700 μm or less), or may be 600 μm or less (for example, 500 μm or less, 400 μm or less, or 350 μm or less).

The lower limit of the width of the clearance may be, for example, 3 μm, 5 μm, 7 μm, 10 μm, 15 μm, 20 μm, 30 μm, or 50 μm.

Specific examples of the width of the clearance include 3 to 2,000 μm, 10 to 1,000 μm, 20 to 500 μm, 30 to 400 μm, 50 to 300 μm, and 100 to 200 μm.

The clearance preferably has a moderate width so as not to notice the clearance.

Not to notice the clearance, it is conceivable that the width of the clearance may be preferably closer to zero as much as possible. However, in order to perform printing such that substantially no clearance is observed generally as in the first aspect in all of a plurality of differently colored printed areas, complicated print setting may be needed, or color mixing (bleeding) may be caused in some differently colored printed areas. A clearance having a few finite width may be unnoticeable (for example, such a clearance may be scarcely observed at least visually). Hence, the clearance has a moderate finite width in practice.

The clearance width may be the same as or different from that of a clearance set at the time of printing (corresponding to the setting clearance described later). For example, even when printing is performed so as to form a clearance having a certain width X in the print setting, color inks slightly spread between different colors, and thus the clearance may have a width smaller than X in the differently colored printed area.

When a clearance has such a smaller width as above, the width of the clearance (the actually observed clearance on the printed base material) in the differently colored printed area varies with the actually set width, the color width, or the like, and may be, for example, 0.99 or less, 0.98 or less, 0.97 or less, 0.96 or less, 0.95 or less, 0.9 or less, 0.85 or less, 0.8 or less, 0.75 or less, 0.7 or less, 0.65 or less, 0.6 or less, 0.55 or less, or 0.5 or less when the clearance width set at the time of printing is 1. The lower limit may be, for example, 0.05, 0.1, 0.15, 0.2, 0.25, 0.3, 0.35, 0.4, 0.45, 0.5, 0.55, 0.6, 0.65, 0.7, or 0.75.

Specific examples of the clearance width in the differently colored printed area include 0.1 to 0.99, 0.2 to 0.98, 0.3 to 0.97, and 0.4 to 0.96 where the clearance width set at the time of printing is 1.

The clearance size in the differently colored printed area may be selected according to the widths of different colors or a printing resolution.

For example, when different colors are a first color and a second color, the width of the first color or the second color (for example, the smaller width of them, or the width of a color that forms a pattern) is A (μm), and the width of the clearance is B (μm), the ratio of B/A can be selected from a range of about 10 or less (for example, 9.5 or less, or 9 or less), may be 8 or less (for example, 7.5 or less), preferably 7 or less (for example, 6 or less), more preferably 5 or less (for example, or less), and particularly about 3 or less (for example, 2.5 or less), and may be, for example, 2 or less (for example, 1 or less, 0.8 or less, 0.5 or less, 0.3 or less, or 0.1 or less).

Examples of the lower limit of the ratio of B/A include 0.005, 0.01, 0.015, 0.02, 0.03, 0.05, 0.08, 0.1, 0.15, 0.2, 0.3, 0.4, and 0.5.

Specific examples of the ratio of B/A include 0.005 to 7, 0.01 to 5, 0.15 to 3, and 0.2 to 2.

The noticeability of a clearance also seems to be affected by the color width (when different colors have different widths, a smaller width), and such a range as above can suppress the noticeability of a clearance and can also efficiently reduce bleeding.

As for the clearance width, when the printing resolution is X (dpi), and the number of pixels corresponding to the width of the clearance is Y, the ratio of X/Y [dpi/number (number of pixels)] may be, for example, about 20 to 800 (for example, 22 to 700, 25 to 650, 28 to 600, 30 to 550, 40 to 500, or 45 to 450).

For example, when the resolution is 600 dpi, and the number of pixels corresponding to the width of the clearance is 2 pixels, the clearance width corresponds to 2 pixels [about 85 μm (2.54 cm/600×2)], and the ratio of X/Y is 300, which is within the above range of the ratio of X/Y (20 to 800).

The noticeability of a clearance also seems to be affected by the resolution. Hence, by setting a clearance in association with a resolution as described above, the noticeability of the clearance can be reduced, and bleeding can also be efficiently reduced.

In addition, the ratio of X/Y may be selected according to the widths of different colors.

For example, in the differently colored printed area, when the width of the first color or the second color (for example, the smaller width of them, or the width of a color that forms a pattern) is relatively small (for example, 500 μm or less, 300 μm or less, or 200 μm or less), the ratio of X/Y may be set at a moderately small value (for example, 50 or more, 80 or more, 100 or more, 120 or more, more than 120, or 125 or more).

Meanwhile, in the differently colored printed area, when the width of the first color or the second color (for example, the smaller width of them, or the width of a color that forms a pattern) is relatively large (for example, more than 500 μm, or 600 μm or more), the ratio of X/Y may be set at a moderately large value (for example, 200 or less, 150 or less, or 120 or less).

By selecting the ratio of X/Y according to a color width as above, the noticeability of the clearance can be more efficiently reduced.

The printed area (differently colored printed area) may be solid or may have (form) a pattern.

The pattern is not specifically limited and can be selected according to the application of a base material (printed base material), a display purpose, or the like. Examples of the pattern include characters (such as hiragana characters, katakana characters, Chinese characters, and alphabets), numeric characters (such as Arabic numerals and Roman numerals), and figures.

The figure may be a pattern-like figure (graphic pattern) such as a bar code and a two-dimensional code.

A bar code with bleeding or large clearances is difficult to be recognized or cannot be recognized (is difficult to read or cannot be read), and thus a recognizable bar code is difficult to print.

In the present invention, a recognizable (readable) bar code can be efficiently printed (recorded), for example, by controlling the clearance width using a particular index.

Whether a bar code is capable of being recognized (readable) can be determined by a bar-code reader (for example, the method described later).

Specific aspects of the differently colored printed area include a case (i) in which, of the different first and second colors, the first color is in a pattern, and the second color serves as a background and a case (ii) in which the first color and the second color form a pattern in combination (for example, a case in which the first color and the second color are alternately, adjacently arranged to form a stripe pattern, or a case in which the first color has a wave pattern, and the second color has a wave pattern along the wave pattern of the first color). A typical differently colored printed area is the differently colored printed area in the case (i).

The printed area may have one differently colored printed area or two or more differently colored printed areas as described above and may particularly have two or more (a plurality of) differently colored printed areas.

When the printed area has a plurality of differently colored printed areas, the plurality of differently colored printed areas may be the identical differently colored printed areas or non-identical differently colored printed areas (for example, differently colored printed areas that are not identical in at least one selected from color type, color combination, color width, clearance width, pattern, etc.).

For example, a plurality of differently colored printed areas may have a portion having a larger width (for example, more than 500 μm) and a portion having a smaller width (for example, 500 μm or less) in combination. For convenience, a specific example in which a printed area has two non-identical differently colored printed areas, a differently colored printed area 1 and a differently colored printed area 2, will be described. The example include a case in which the width of at least one of the different colors in the differently colored printed areal (for example, the smaller width of them, or the width of a color that forms a pattern) is more than 500 μm, and the width of at least one of the different colors in the differently colored printed area 2 (for example, the smaller width of them, or the width of a color that forms a pattern) is 500 μm or less.

The visibility of the differently colored printed area (the difficulty in noticing the clearance) in the second aspect can be controlled depending on the color width as mentioned above. Hence, even when the printed area comprises a differently colored printed area having a color with a larger width and a differently colored printed area having a color with a smaller width in combination as above, a plurality of visible differently colored printed areas can be efficiently formed (generally) in the whole printed base material.

A plurality of differently colored printed areas typically include at least non-identical differently colored printed areas in many cases. To make clearances less noticeable efficiently while color bleeding is generally reduced in the non-identical differently colored printed areas, the clearance of each differently colored printed area is preferably selected (according to a differently colored printed area) by a particular index (color width, resolution, etc.).

The printed area comprises at least a differently colored printed area (particularly a plurality of non-identical differently colored printed areas) and may comprise a uniform color printed area (for example, a solid (monochromatic solid) printed area, or a printed area having a monochromatic pattern).

Production Method

A printed base material can be produced by forming (recording) a printed area on a base material.

In the present invention, when the differently colored printed area (a printed area in which different colors are adjacently printed) of the printed area is printed, the printing is performed so as to form a clearance between different colors (or to provide a clearance between different colors).

By such printing as above, the printed base material as above can be efficiently produced. In other words, bleeding can be reduced or prevented in the differently colored printed area. Hence, the method can also be considered as a method for reducing or preventing bleeding in the differently colored printed area.

Even when printing is performed so as to form a clearance (while clearance formation is set), different color inks may slightly spread to each other. Even in such a case, when the size (width) of a clearance is equal to the size (width) of a spread, different color inks spread toward each other but cause no bleeding, and accordingly a differently colored printed area having (apparently) no clearance between the different colors is formed (the differently colored printed area in the first aspect).

The printing method is not limited and can be specifically ink-jetting (ink-jet system).

In the ink-jetting, examples of the ink-jet system include a continuous type and an on-demand type (such as a piezoelectric system, a thermal system, and a valve system). The ink-jet system is typically an on-demand type (for example, a piezoelectric system).

The printing apparatus can be selected according to a printing method, and an ink-jet printer may be used in the ink-jetting, for example.

When a clear ink is used in combination, a printer head comprising an ink chamber for ejecting a color ink and an ink chamber for ejecting the clear ink may be used.

Printing (including ejection of an ink) may be performed while a base material is conveyed.

In such a case, the conveyance speed can be appropriately selected according to the type of a base material or the like and may be, for example, 1 to 20 m/min (for example, 2 to 15 m/min or 3 to 12 m/min).

In the printing (ink-jetting), inks, resolutions, and other conditions are as described above.

The ink ejection amount per drop (dot) may be, for example, μL or more (for example, 3 μL or more), preferably 5 μL or more (for example, 7 μL or more), and more preferably about 8 μL or more (for example, 9 μL or more).

The upper limit of the ink ejection amount per drop (dot) may be, for example, 50 μL, 30 μL, 20 μL, or 15 μL.

The above ejection amount is applicable to both the color ink and the clear ink.

When a clear ink is particularly used in combination, the total of the ejection amounts of the color ink and the clear ink [ejection amount per drop (dot)] may be 1.1 or more, preferably 1.3 or more, and more preferably 1.5 or more (for example, 1.8 or more) and may be, for example, 10 or less, 8 or less, 5 or less, or 3 or less, where the ejection amount of the color ink is 1.

When the clear ink is used in combination, the ejection amount increases (accordingly the solvent amount increases in a printed area) as compared with when only the color ink is used, but even when the solvent amount increases, printing while a clearance is formed enables efficient reduction of bleeding.

An ink may be ejected while a carriage (a carriage having a head) is scanned (transferred). In such a case, the scanning direction may be, for example, a direction orthogonal to the conveyance direction of a base material. The scanning speed may be, for example, 30 m/min or more (for example, 40 to 500 m/min), preferably 50 m/min or more (for example, 80 to 300 m/min), and more preferably about 100 m/min or more (for example, 120 to 200 m/min).

As described above, when a differently colored printed area is printed, printing is performed so as to form a clearance between different colors (by adjusting a printing apparatus). The clearance has been specifically described above, and a clearance set at the time of printing (also called setting clearance, etc.) may also be the same as above.

For example, the width of a clearance (setting clearance, hereinafter the same is applied to a clearance set at the time of printing) may be selected, for example, from a range of about 2,000 μm or less, may be 1,500 μm or less, preferably 1,000 μm or less, and more preferably about 800 μm or less (for example, 700 μm or less), and may be 600 μm or less (for example, 500 μm or less, 400 μm or less, or 350 μm or less).

The lower limit of the width of the setting clearance may be, for example, 3 μm, 5 μm, 7 μm, 10 μm, 15 μm, 20 μm, 30 μm, or 50 μm.

Specific examples of the width of the setting clearance include 3 to 2,000 μm, 10 to 1,000 μm, 20 to 500 μm, 30 to 400 μm, 50 to 300 μm, and 100 to 200 μm.

As described above, due to ink spreading or the like, a clearance [also called actual clearance, etc. (in contrast to setting clearance)] in a formed differently colored printed area may be smaller than the setting clearance.

Hence, the setting clearance may have the same width as that of the actual clearance or may have a larger width than that of the actual clearance (intended clearance). When a setting clearance has a larger width, the larger width can be selected according to an expected ink spread, the width of an intended clearance, or the like and is not specifically limited.

In such a case, the width of the setting clearance may be larger than the width of the actual clearance, for example, by 1 μm or more [for example, 1.5 μm or more (for example, 2 to 300 μm), 2.5 μm or more (for example, 3 to 250 μm), 3.5 μm or more (for example, 4 to 200 μm), or about 4.5 μm or more (for example, 5 to 150 μm)].

Alternatively, the width of the setting clearance may be more than 1 time [for example, 1.001 or more times (for example, 1.005 or more times), 1.01 or more times (for example, 1.02 or more times), 1.05 or more times (for example, 1.07 or more times), 1.08 or more times, or 1.1 or more times] the width of the actual clearance, and may be 5 or less times (for example, 4 or less times, 3.5 or less times, 3 or less times, 2.5 or less times, 2 or less times, 1.8 or less times, 1.5 or less times, 1.3 or less times, 1.2 or less times, 1.1 or less times, or 1.05 or less times) the width of the actual clearance.

The clearance size can be selected according to the widths of different colors or a printing resolution, as described above.

For example, when different colors are a first color and a second color, the width of the first color or the second color (for example, the smaller width of them, or the width of a color that forms a pattern) is A (μm), and the width of the clearance is B (μm), the ratio of B/A can be selected from a range of about 10 or less (for example, 9.5 or less, or 9 or less), may be 8 or less (for example, 7.5 or less), preferably 7 or less (for example, 6 or less), more preferably 5 or less (for example, 4 or less), and particularly about 3 or less (for example, 2.5 or less), and may be, for example, 2 or less (for example, 1 or less, 0.8 or less, 0.5 or less, 0.3 or less, or 0.1 or less).

Examples of the lower limit of the ratio of B/A include 0.005, 0.01, 0.015, 0.02, 0.03, 0.05, 0.08, 0.1, 0.15, 0.2, 0.3, 0.4, and 0.5.

Specific examples of the ratio of B/A include 0.005 to 7, 0.01 to 5, 0.15 to 3, and 0.2 to 2.

The clearance width may be set as follows: when the printing resolution is X (dpi), and the number of pixels corresponding to the width of clearance is Y, the ratio of X/Y [dpi/number (number of pixels)] may be, for example, about 20 to 800 (for example, 22 to 700, 25 to 650, 28 to 600, 30 to 550, 40 to 500, or 45 to 450).

The ratio of X/Y can also be selected according to the widths of different colors.

For example, when the width of the first color or the second color (for example, the smaller width of them, or the width of a color that forms a pattern) is relatively small (for example, 500 μm or less, 300 μm or less, or 200 μm or less), the ratio of X/Y may be a moderately small value (for example, 50 or more, 80 or more, 100 or more, 120 or more, more than 120, or 125 or more).

Meanwhile, when the width of the first color or the second color (for example, the smaller width of them, or the width of a color that forms a pattern) is relatively large (for example, more than 500 μm, or 600 μm or more), the ratio of X/Y may be a moderately large value (for example, 200 or less, 150 or less, or 120 or less).

By selecting (controlling) the clearance setting according to conditions such as color width and resolution as described above, a natural differently colored printed area in which bleeding between colors is reduced and a clearance is less noticeable can be efficiently formed.

As described above, such printing conditions as above (clearance conditions, etc.) may be quite equally reflected or may be differently reflected in a printed area (differently colored printed area).

For example, even when printing is performed by ink-jetting, dots may collapse in the printed area, or the clearance in the differently colored printed area may have a smaller width than that of a clearance set at the time of printing.

As described above, when at least one ink of the different color inks spreads to the other ink (especially both the inks spread to each other), the color width set at the time of printing [for example, the width (length) corresponding to the number of pixels] becomes larger in the printed area, and this results in a smaller actual clearance than the setting clearance.

In such a case, when the color width set at the time of printing (hereinafter also called setting color width, etc.) is C1, and the color width in the differently colored printed area [hereinafter also called actual color width, etc. (in contrast to the setting color width)] is C2, the difference therebetween [C2 (actual color width C2)−C1 (setting color width C1)] may be, for example, 0.5 μm or more (for example, 0.8 μm or more, 1 μm or more, 1.5 μm or more, 2 μm or more, 2.5 μm or more, 3 μm or more, 3.5 μm or more, 4 μm or more, 4.5 μm or more, or 5 μm or more) and may be 300 μm or less (for example, 280 μm or less, 250 μm or less, 200 μm or less, 180 μm or less, 150 μm or less, 120 μm or less, 100 μm or less, 80 μm or less, 70 μm or less, or 50 μm or less).

After printing, the printed area may be subjected to heat treatment (drying treatment) as needed. By the heat treatment, solvents can be removed from the printed area. When an ink containing a cross-linking agent is used, cross-linking may proceed together with heating (drying).

Applications of Printed Base Material, Etc.

The printed base material can be directly used for various applications according to the type and conditions of a base material or as needed, may be further formed (processed) into an intended molded article.

For example, a printed base material comprising a plastic film (blown film, etc.) as the base material can be subjected to heat-sealing, cutting, port (content filling port) attachment, and other steps into a soft bag (a soft bag for medical use).

The resulting soft bag can be further subjected, for example, to content (infusion, etc.) filling, high-pressure sterilizing (high-pressure shower sterilizing), and other steps into a soft bag (infusion bag) containing a content.

In the formation processing after printing, various loads are applied to the printed base material, and thus a printed area (differently colored printed area) insufficiently fixed (recorded) may fall.

For example, in the above example in which a printed base material is processed into an infusion bag, after high-pressure sterilization or other treatments, the printed area (differently colored printed area) is prone to fall.

Alternatively, a printed area insufficiently fixed is prone to fall when coming into contact with a chemical agent (for example, an alcohol such as ethanol).

To efficiently prevent a printed area from falling as above, a clear ink is preferably used in combination to make the resin amount sufficient in the printed area (differently colored printed area), for example. The clear ink, however, may be likely to cause bleeding (color mixing) between colors in the differently colored printed area and to result in marked deterioration in visibility or appearance of a printed area.

According to the present invention, as described above, bleeding in the differently colored printed area can be efficiently reduced even when a clear ink is used, and robust printing (recording) (for example, giving abrasion resistance, excellent adhesion, and chemical resistance) required in a soft bag for medical use and the like and bleeding reduction (accordingly an unnoticeable clearance) can be efficiently satisfied.

EXAMPLES

The present invention will next be described in further detail with reference to examples, but the present invention is not limited to the examples.

Used materials are as described below.

Inks (Color Inks and Clear Ink)

Inks 1 to 4 and 8 described in examples in JP 2020-19180 were prepared and used as color inks. An ink 9 described in an example in JP 2020-19180 was prepared and used as a clear ink.

The formulation of each ink is as shown below. In Table 1, "parts" means parts by mass.

TABLE 1

|  |  | Ink 1 | Ink 2 | Ink 3 | Ink 4 | Ink 8 | Ink 9 |
| --- | --- | --- | --- | --- | --- | --- | --- |
| Organic solvent (parts) | Propylene glycol | 10 | 10 | 10 | 10 | 10 | 10 |
|  | 2-Pyrrolidone | 13 | 13 | 13 | 13 | 13 | 13 |
| Pigment (parts) | Black pigment | 3 |  |  |  |  |  |
|  | Cyan pigment |  | 3 |  |  |  |  |
|  | Magenta pigment |  |  | 3 |  |  |  |
|  | Yellow pigment |  |  |  | 3 |  |  |
|  | White pigment |  |  |  |  | 8 |  |
| Resin (parts) | Joncryl 62J | 6 | 6 | 6 | 6 | 6 | 7 |
|  | AQUACER 539 | 1 | 1 | 1 | 1 | 1 | 2 |
| Antifoaming agent (parts) | DF 110D | 0.1 | 0.1 | 0.1 | 0.1 | 0.1 | 0.1 |
| Surfactant (parts) | BYK 348 | 1 | 1 | 1 | 1 | 1 | 1 |
| Pure water (parts) | — | Remainder | Remainder | Remainder | Remainder | Remainder | Remainder |
| Total amount (parts) | — | 100 | 100 | 100 | 100 | 100 | 100 |
| Viscosity | mPa·s | 4.9 | 4.9 | 4.9 | 4.9 | 4.9 | 4.9 |

Antifoaming Agent
   DF 110D: product name "Surfynol DF 110D", an acetylenic diol surfactant manufactured by Nissin Chemical Industry Co., Ltd.
Surfactant
   BYK 348: product name, a silicone surfactant manufactured by BYK Japan KK.
Pigment
   Black pigment: carbon black
   Cyan pigment: C.I. Pigment Blue 15:3
   Magenta pigment: C.I. Pigment Red 122
   Yellow pigment: C.I. Pigment Yellow 150
   White pigment: C.I. Pigment White 6
Resin
   Joncryl 62J (product name, a styrene-acrylic resin manufactured by BASF Japan Ltd.)
   AQUACER 539 (product name, a modified paraffin wax emulsion for aqueous systems manufactured by BYK Japan KK) Various measurements and analyses were performed as described below.
Viscosity
   A rheometer (product name "MCR 300", Anton Paar) was used for measurement at a measurement temperature of 32° C. and a shear velocity of 200 $s^{-1}$.
Wetting Tension
   As the wetting reagent, wetting tension test mixtures (FUJIFILM Wako Pure Chemical Corporation, etc.) were used. A swab was immersed in No. 35 wetting tension test mixture, and the liquid on the swab was applied to a material to be printed. When the material wet with the liquid was observed after 2 seconds, the material was evaluated to have a wetting tension of 35.
   A fresh swab was immersed in No. 45 wetting tension test mixture, and a similar operation was performed. When a material to be printed repelled the liquid within 2 seconds, the material was evaluated to have a wetting tension of 45 or less. Provided that a material to be printed had a wetting tension of between and 45, appropriate wetting tension test mixtures were used, and the maximum value of the wetting tension test mixtures with which a material to be printed was wet for 2 seconds was considered as the wetting tension of the material to be printed.
Bar Code Recognizability
   About 20 cm above a printed base material (bar code portion), SR 2000 manufactured by Keyence Corporation was placed, and image capturing and reading was performed. The SR 2000 had been calibrated with a calibration sheet so as to give the closest validation results to the validation results (modulation, decodability, and defect) by a validation machine. When having a modulation of 25% or more, a decodability of 37% or more, and a defect of less than 30%, the bar code was evaluated as recognizable.
Visual Evaluation
   A sample was visually observed from a distance of about 40 cm, and bleeding and a clearance were evaluated in accordance with the following criteria.
   A: No clearance was observed.
   B: Almost no clearance was observed.
   C: A clearance was observed but unnoticeable
   D: A clearance was noticeably observed.
   The above observation was performed by 30 persons, and the most common result was regarded as the visual evaluation result.

Example 1

Production of Printed Base Material
   From an original roll, a rolled film prepared by sucking air from the inside of a blown tubular film (a laminated film of polybutylene terephthalate and an olefinic resin) was fed while a printing face (a polybutylene terephthalate face (having a wetting tension of 38 dyn/cm) of the laminated film) faced upward, and a printed area was formed by ink-jetting while the solid transparent strip-shaped film was fed to a buffer roll and was conveyed.
   In other words, the tubular film was a simulated soft bag for medical use, and on the film, inks were ejected so as to form a plurality of differently colored printed areas in the conditions shown in Table 2.

TABLE 2

| | Differently colored printed area | | | |
|---|---|---|---|---|
| | 1 | 2 | 3 | 4 |
| Resolution X | | | | |
| Longitudinal direction | 600 dpi | 600 dpi | 600 dpi | 600 dpi |
| Transverse direction | 600 dpi | 600 dpi | 600 dpi | 600 dpi |
| Ejection amount | | | | |
| Color ink | 12 pL/dot | 12 pL/dot | 12 pL/dot | 12 pL/dot |
| Clear ink | 10 pL/dot | 10 pL/dot | 10 pL/dot | 10 pL/dot |
| First color | | | | |
| Pattern | Sugar-added electrolytic solution (maintenance solution) in Chinese characters (see FIGS. 1 and 2) | Infusion in Chinese characters (see FIGS. 3 and 4) | 1000 mL | Bar code (striped pattern of bars) |
| Width 1 | 339 μm | 1525 μm | 2329 μm | 339 μm |
| Color | white | blue | yellow | blue |
| Second color | | | | |
| Pattern | none (background of first color) | none (background of first color) | none (background of first color) | none (background of first color) |
| Width 2 (narrowest portion) | 169 μm | 593 μm | 2795 μm | 339 μm |

TABLE 2-continued

| | Differently colored printed area | | | |
|---|---|---|---|---|
| | 1 | 2 | 3 | 4 |
| Color | blue | red | red | white |
| Clearance | | | | |
| Longitudinal direction | | | | |
| Width B | 84.7 μm | 169 μm | 254 μm | 169 μm |
| | (2 pixels) | (4 pixels) | (6 pixels) | (4 pixels) |
| Width B/Width 1 | 0.25 | 0.11 | 0.11 | 0.46 |
| Width B/Width 2 | 0.5 | 0.28 | 0.09 | 0.54 |
| X/Y | 300 | 150 | 100 | 150 |
| Transverse direction | | | | |
| Width B | 84.7 μm | 169 μm | 254 μm | 169 μm |
| | (2 pixels) | (4 pixels) | (6 pixels) | (4 pixels) |
| Width B/Width 1 | 0.25 | 0.11 | 0.11 | 0.46 |
| Width B/Width 2 | 0.5 | 0.28 | 0.09 | 0.54 |
| X/Y | 300 | 150 | 100 | 150 |

The colors (the pattern and the background thereof) in each differently colored printed area were printed in the transverse direction of the film (i.e., each of "Sugar-added electrolytic solution (maintenance solution)" in Chinese characters in the differently colored printed area 1, "Infusion" in Chinese characters in the differently colored printed area 2, "1000 mL" in the differently colored printed area 3, and bars constituting a bar code in the differently colored printed area 4 formed a character string or a bar code in the transverse direction of the film).

The ink ejection head of the ink-jet printer moved (a head scanning speed of 152 m/min) in a direction orthogonal to the film traveling direction (the longitudinal direction, a film conveyance speed of 8 m/min) (i.e., moved in the transverse direction), and inks were ejected from nozzles while the head moved. The ink ejection head ejected inks during reciprocating. When the ink ejection head moved forward, a color ink was ejected, and immediately after that (almost at the same time), a clear ink was ejected. When the ink ejection head moved backward, the clear ink was ejected, and immediately after that, the color ink was applied. This process is based on the structure of the ejection head and is because the nozzle for ejecting the color ink and the nozzle for ejecting the clear ink are arranged in this order in the forward traveling direction.

When the ink ejection head moved forward, the clear ink is ejected to the color ink ejected area (when the ink ejection head moved backward, the clear ink is ejected to the area to which the color ink is to be ejected), and the clear ink is not entirely ejected to the whole film (to an area to which the color ink is not ejected, the clear ink is not ejected).

The film to which the inks had been ejected was further conveyed while hot air was sprayed, thus the printing face was dried, and an object (a film comprising a printed area having a plurality of differently colored printed areas) was produced.

Evaluation of Printed Base Material
Differently Colored Printed Area 1

Figure 1:
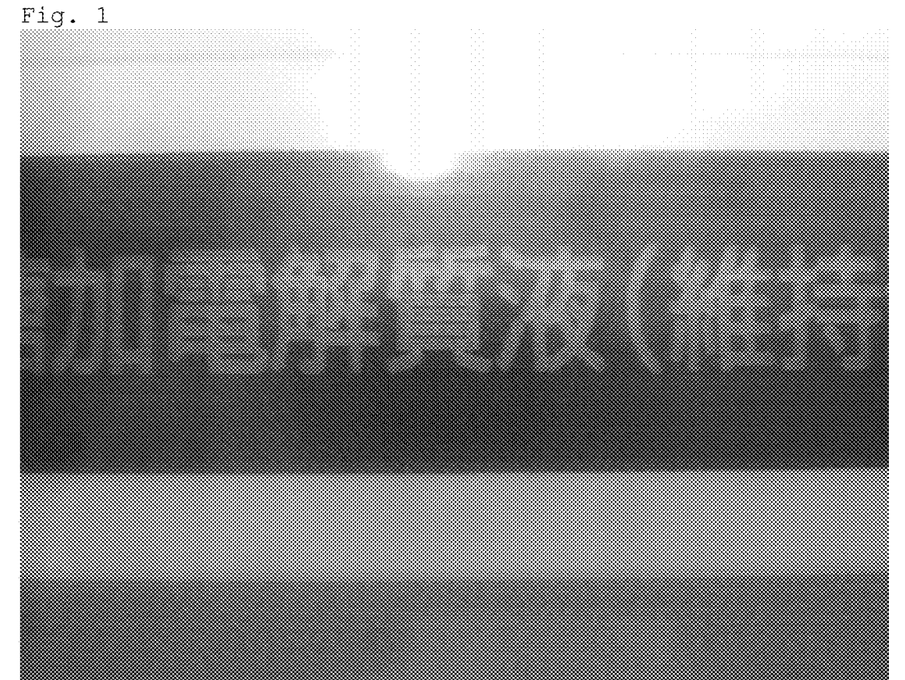
FIG. 1 is a close-up photograph of a differently colored printed area 1 in a printed base material produced in Example 1.
Figure 2:
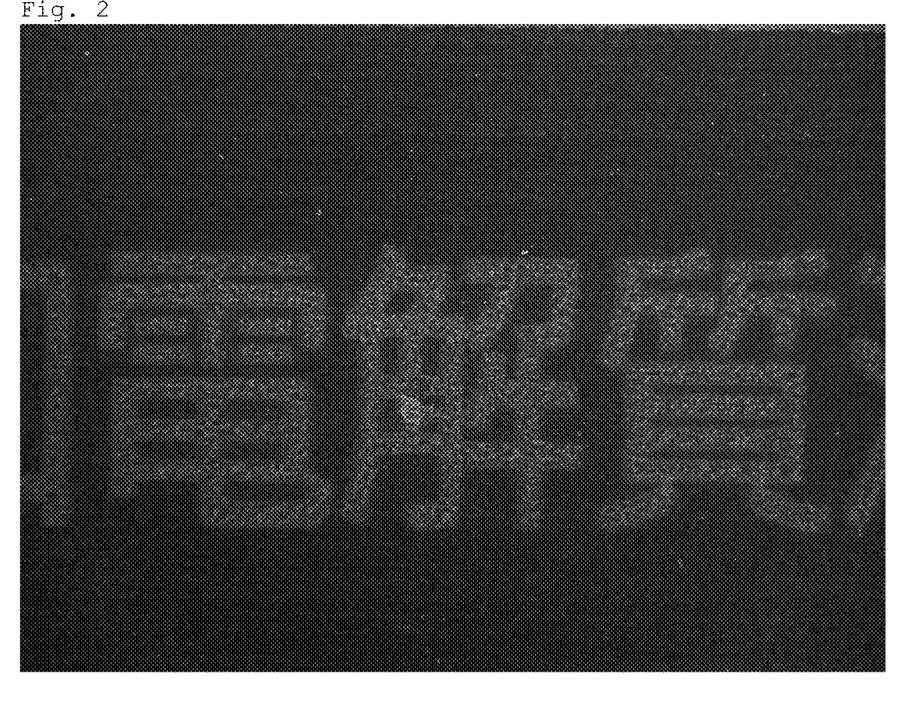
FIG. 2 is a micrograph of the differently colored printed area 1 in the printed base material produced in Example 1.

A close-up photograph of the differently colored printed area1 of the produced film is shown in FIG. 1, and a micrograph (×20, black background) is shown in FIG. 2.

In the differently colored printed area 1 in which each character having a relatively narrow width (i.e., each character of the character string "Sugar-added electrolytic solution (maintenance solution)" in Chinese characters) was a first color, no bleeding was visually observed between the first color and the background thereof (judgment A), and no clearance was identified (judgment A). This result was also seen from the tight close-up photograph in FIG. 1 and the enlarged photograph in FIG. 2.

In the differently colored printed area 1, the clearance set at the time of printing was quite unnoticeable as mentioned above, but a clearance (clearance between the character string and the background thereof) was slightly identified by observation under a microscope at a higher magnification [about 78 μm in the longitudinal direction (about 0.92 times the clearance set at the time of printing (1.8 pixels), width 1 (350 μm), width 2 (175 μm), width B/width 1=0.22, width B/width 2=0.45, X/Y=333); and about 42 μm in the transverse direction (0.50 times the clearance set at the time of printing (0.99 pixels), width 1 (350 μm), width 2 (175 μm), width B/width 1=0.12, width B/width 2=0.24, X/Y=606)].

The first color is white, and this suggests that the white color also relates to the unnoticeable clearance.

Differently Colored Printed Area 2

Figure 3:
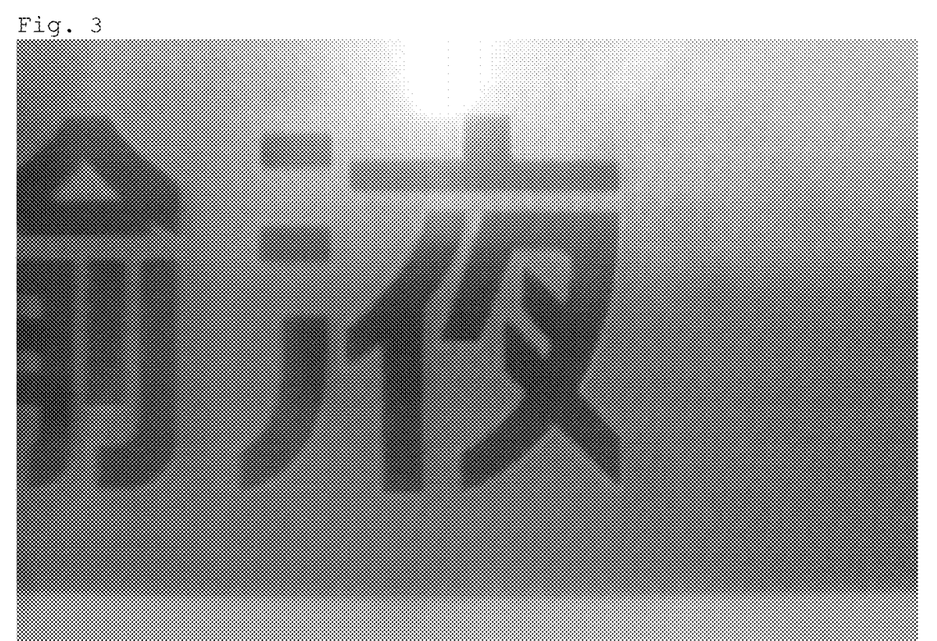
FIG. 3 is a close-up photograph of a differently colored printed area 2 in the printed base material produced in Example 1.
Figure 4:
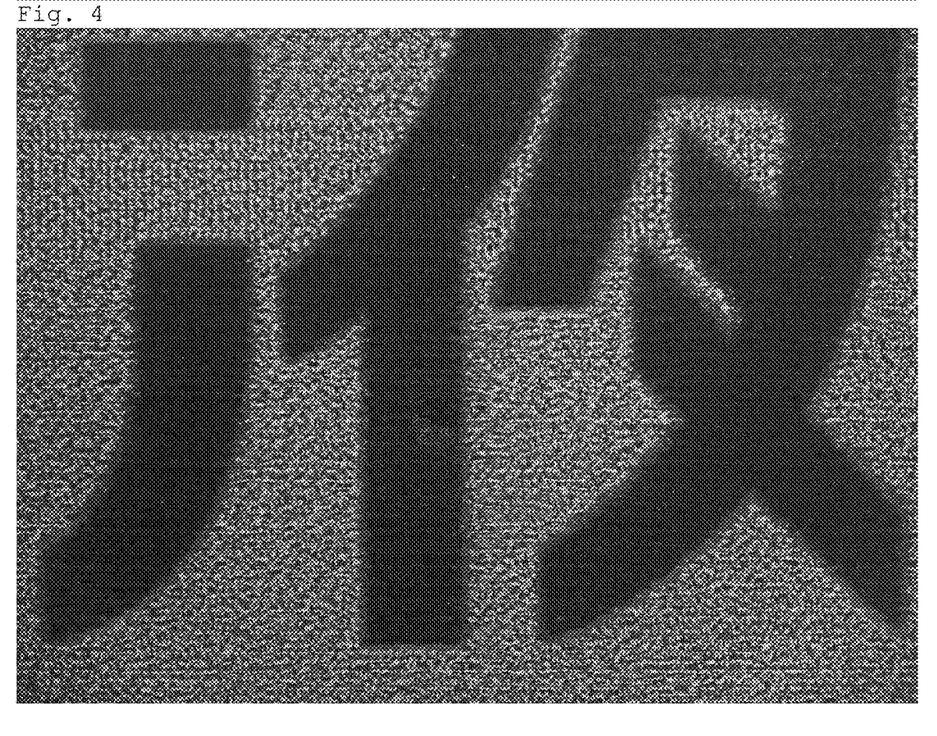
FIG. 4 is a micrograph of the differently colored printed area 2 in the printed base material produced in Example 1.

Similarly, a close-up photograph of the differently colored printed area 2 is shown in FIG. 3, and a micrograph (×20, black background) is shown in FIG. 4.

In the differently colored printed area 2 in which each character having a medium width (i.e., each character of the character string "Infusion" in Chinese characters) was a first color, no bleeding was visually observed between the first color and the background thereof (judgment A), and almost no clearance was identified (judgment B). In other words, in the tight close-up photograph in FIG. 3, a noticeable clearance was not identified between the first color (the character string) and the background, and a noticeable clearance was observed only in the enlarged photograph in FIG. 4.

In the differently colored printed area 2, almost no clearance that had been set at the time of printing was visually identified as mentioned above, but a clearance was identified by observation under a microscope [about 159 μm in the longitudinal direction (about 0.94 times the clearance set at the time of printing (3.8 pixels), width 1 (1,636 μm), width (630 μm), width B/width 1=0.097, width B/width 2=0.25, X/Y=158); and about 116 μm in the transverse direction (0.69 times the clearance set at the time of printing (2.7 pixels), width 1 (1,636 μm), width 2 (630 μm), width B/width 1=0.071, width B/width 2=0.18, X/Y=222)].

Differently Colored Printed Area 3

Figure 5:
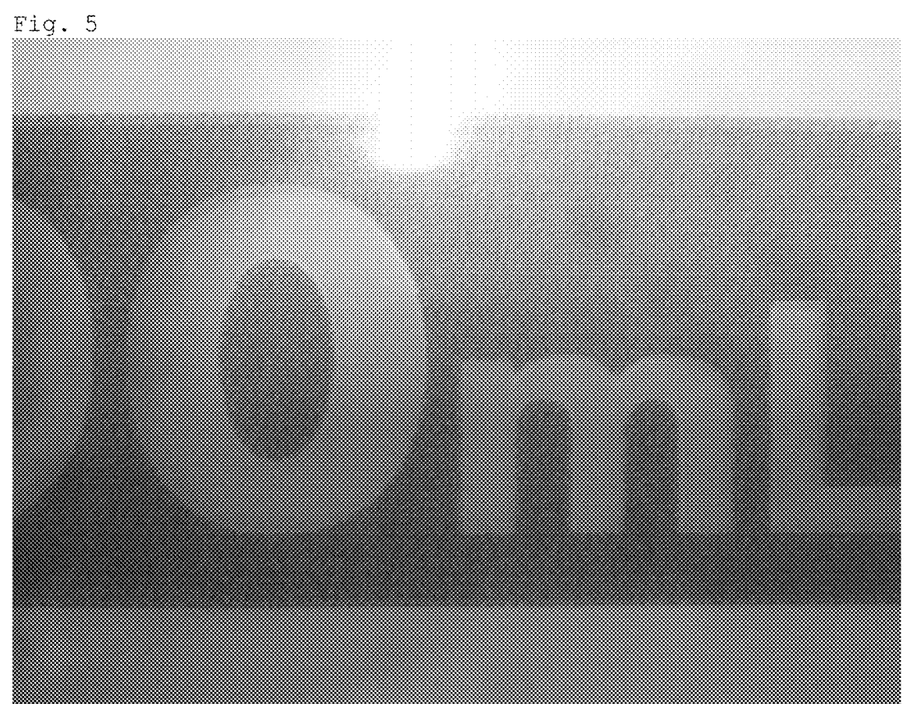
FIG. 5 is a close-up photograph of a differently colored printed area 3 in the printed base material produced in Example 1.
Figure 6:
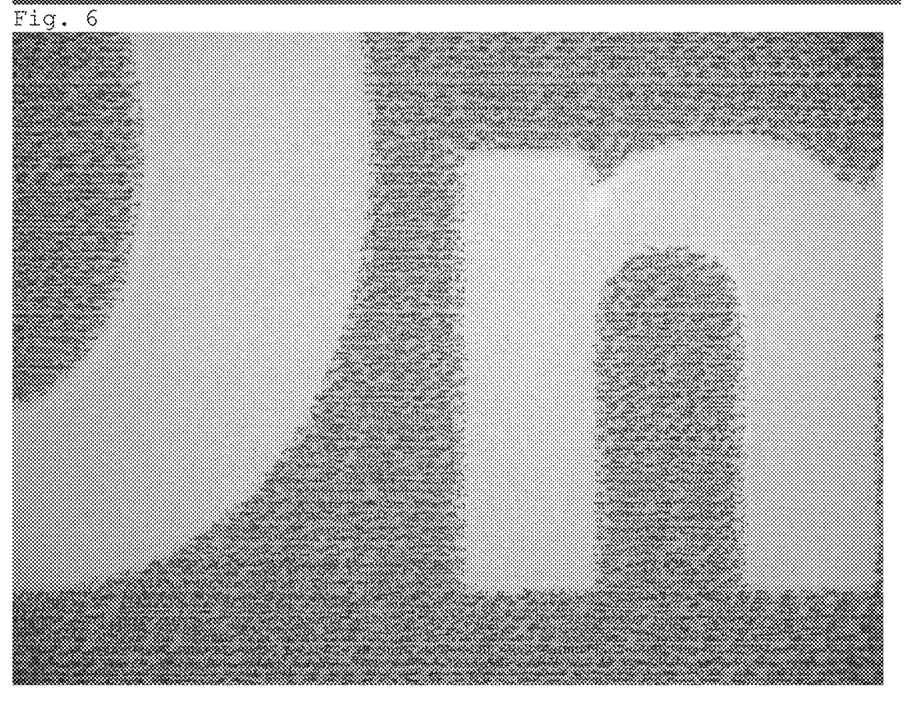
FIG. 6 is a micrograph of the differently colored printed area 3 in the printed base material produced in Example 1.

Similarly, a close-up photograph of the differently colored printed area 3 is shown in FIG. 5, and a micrograph (×20, white background) is shown in FIG. 6.

In the differently colored printed area 3 in which each character having a relatively large width (i.e., each character of the character string "1000 mL" (numeric characters and alphabets)) was a first color, no bleeding was visually observed between the first color and the background thereof (judgment A), and almost no clearance was identified (judgment B). In other words, in the tight close-up photograph in FIG. 5, a clearance was slightly identified partly between the first color (the character string) and the background, and a noticeable clearance was observed only in the enlarged photograph in FIG. 6.

In the differently colored printed area 3, almost no clearance that had been set at the time of printing was visually identified as mentioned above, but a clearance was identified by observation under a microscope [about 226 μm in the longitudinal direction (about 0.89 times the clearance set at the time of printing (5.3 pixels), width 1 (2,388 μm), width (2,802 μm), width B/width 1=0.095, width B/width 2=0.081, X/Y=113); and about 144 μm in the transverse direction (0.57 times the clearance set at the time of printing (3.4 pixels), width 1 (2,388 μm), width 2 (2,802 μm), width B/width 1=0.060, width B/width 2=0.051, X/Y=176)].

Differently Colored Printed Area 4

In the differently colored printed area 4 (bar code), no bleeding was visually observed between a first color (bars of the bar code) and the background thereof (judgment A), and no clearance was identified (judgment A). The white background color also supposedly relates to the visually unobservable clearance.

The differently colored printed area 4 was examined by the above method whether the printed area was capable of being recognized as a bar code, and the result revealed that the printed area was recognizable.

The differently colored printed area 4 was also observed in an enlarged photograph, and a clearance was identified [about 154 μm in the longitudinal direction (about 0.91 times the clearance set at the time of printing (3.6 pixels), width 1 (367 μm), width 2 (350 μm), width B/width 1=0.42, width B/width 2=0.44, X/Y=167); and about 118 μm in the transverse direction (about 0.7 times the clearance set at the time of printing (2.8 pixels), width 1 (367 μm), width 2 (350 μm), width B/width 1=0.32, width B/width 2=0.34, X/Y=214)].

Formation and Evaluation of Infusion Bag

In the prepared film after printing, positions to be four sides of an infusion bag were heat-sealed (except a port attachment position). The heat-sealed film was cut so as to give an infusion bag, and a resin port was attached to the port attachment position by heat-sealing.

After port attachment, a content (infusion) was packed from the port, then a rubber stopper was attached to the port, next a protection film was attached to the port by heat-sealing in order to protect the rubber stopper surface, and the whole was subjected to high-pressure shower sterilizing to give an infusion bag.

The steps before the high-pressure shower sterilizing were performed in an in-line system.

During the process of forming the infusion bag, the differently colored printed areas 1 to 4 did not fall.

After the high-pressure shower sterilizing, the differently colored printed areas 1 to 4 on the infusion bag were strongly rubbed with fingers but did not fall.

The differently colored printed areas 1 to 4 were wiped with a fabric immersed in ethanol but did not fall.

As described above, it was ascertained that the differently colored printed areas 1 to 4 were firmly printed on the infusion bag.

Reference Example 1

Printing was performed in the same manner as in Example 1 except that no clearance was formed in the differently colored printed areas (between the first color and the second color (background)) in Example 1, giving a printed base material.

In each of the differently colored printed areas 1 to 4 on the prepared film, bleeding was clearly identified between the first color and the background thereof just by visual observation (judgment D).

Reference Example 2

Printing was performed in the same manner as in Example 1 except that no clear ink was used, and no clearance was set in the differently colored printed areas (between the first color and the second color (background)) in Example 1, giving a printed base material.

In each of the differently colored printed areas 1 to 4, bleeding was identified between colors by visual observation but was slightly less than that in Reference Example 1 (judgment C).

The printed base material was used to form an infusion bag in the same manner as in Example 1, and the differently colored printed areas 1 to 4 partly fell. The infusion bag was wiped with a fabric immersed in ethanol, and almost all the differently colored printed areas fell.

Example 2

The same procedure as in Example 1 was performed except that the width of the clearance in the longitudinal direction in the differently colored printed area 1 in Example 1 was changed to a value shown in Table 3, giving a printed base material.

The differently colored printed area 1 on each of the prepared printed base materials was visually evaluated in the same manner as in Example 1. The results are shown in Table 3.

TABLE 3

| Clearance width B | 1690 μm (40 pixels) | 1270 μm (30 pixels) | 845 μm (20 pixels) | 508 μm (12 pixels) | 339 μm (8 pixels) |
|---|---|---|---|---|---|
| Width B/width 1 | 5 | 3.7 | 2.5 | 1.5 | 1 |
| Width B/width 2 | 10 | 7.5 | 5 | 3 | 2 |
| X/Y | 15 | 20 | 30 | 50 | 75 |
| Bleeding | Judgment A | Judgment A | Judgment A | Judgment A | Judgment A |
| Clearance | Judgment D | Judgment C | Judgment B | Judgment A | Judgment A |

Example 3

The same procedure as in Example 1 was performed except that the width of the clearance in the transverse direction in the differently colored printed area 3 in Example 1 was changed to a value shown in Table 3, giving a printed base material.

The differently colored printed area 3 on each of the prepared printed base materials was visually evaluated in the same manner as in Example 1. The results are shown in Table 4.

TABLE 4

| Clearance width B | 127 μm (3 pixels) | 508 μm (12 pixels) | 847 μm (20 pixels) | 1270 μm (30 pixels) |
|---|---|---|---|---|
| Width B/width 1 | 0.07 | 0.26 | 0.43 | 0.67 |
| Width B/width 2 | 0.05 | 0.18 | 0.3 | 0.45 |
| X/Y | 200 | 50 | 30 | 20 |
| Bleeding | Judgment A | Judgment A | Judgment A | Judgment A |
| Clearance | Judgment A | Judgment B | Judgment B | Judgment B |

The results in Tables 3 and 4 clearly revealed that a color having a relatively large width enabled the formation of a differently colored printed area in which a clearance was less noticeable by controlling the ratio of X/Y even when a clearance was set to have a moderately large width.

Example 4

The same procedure as in Example 1 was performed except that a single-layer film of polyethylene (with a printing face having a wetting tension of 35 dyn/cm) was used in place of the tubular film in Example 1, giving a printed base material.

The prepared film showed a similar tendency to that in Example 1 in the differently colored printed areas 1 to 4 and the formation and evaluation of an infusion bag.

Example 5

The same procedure as in Example 1 was performed except that a single-layer film of a mixed resin of polyethylene and polypropylene (with a printing face having a wetting tension of 45 dyn/cm) was used in place of the tubular film in Example 1, giving a printed base material.

The prepared film showed a similar tendency to that in Example 1 in the differently colored printed areas 1 to 4 and the formation and evaluation of an infusion bag.

Example 6

An ink in Example 1 according to JP 2018-141066 was prepared.

The same procedure as in Example 1 was performed except that the prepared ink (cyan) was used in place of the ink 2, giving a printed base material.

The prepared film showed a similar tendency to that in Example 1 in the differently colored printed areas 1 to 4 (particularly the differently colored printed areas 2 and 4) and the formation and evaluation of an infusion bag.

Example 7

The same procedure as in Example 1 was performed except that a black ink (FPG-BK), a cyan ink (FPG-CY), a magenta ink (FPG-MG), and a yellow ink (FPG-YE) manufactured by Roland DG were used in place of the inks 1 to 4, respectively, giving a printed base material.

The prepared film showed a similar tendency to that in Example 1 in the differently colored printed areas 1 to 4 and the formation and evaluation of an infusion bag.

Example 8

The same procedure as in Example 1 was performed except that the resolution in the longitudinal direction in Example 1 was changed to 400 dpi, giving a printed base material.

The prepared film showed a similar tendency to that in Example 1 in the differently colored printed areas 1 to 4 and the formation and evaluation of an infusion bag.

Example 9

The same procedure as in Example 1 was performed except that the resolution in the transverse direction in Example 1 was changed to 200 dpi, giving a printed base material.

The prepared film showed a similar tendency to that in Example 1 in the differently colored printed areas 1 to 4 and the formation and evaluation of an infusion bag.

Example 10

The same procedure as in Example 1 was performed except that the resolution in the longitudinal direction in Example 1 was changed to 300 dpi, and the resolution in the transverse direction was changed to 300 dpi, giving a printed base material.

The prepared film showed a similar tendency to that in Example 1 in the differently colored printed areas 1 to 4 and the formation and evaluation of an infusion bag.

INDUSTRIAL APPLICABILITY

According to the present invention, a novel printed base material and a method for producing the printed base material are provided.

The invention claimed is:

1. A printed base material comprising:
   a printed area on a base material; and
   a printing face,
   wherein:
   the printing face has a wetting tension of 30 dyn/cm to 50 dyn/cm;
   the printed area comprises a differently colored printed area;
   the differently colored printed area has: (i) different colors separated by a clearance; or (ii) adjacently printed different colors that have no bleeding;
   a part of the differently colored printed area has a printing resolution X (dpi);
   a number of pixels corresponding to a width of the clearance in the part of the differently colored printed area is Y; and
   a ratio of X/Y is 20 to 800.

2. The printed base material according to claim 1, wherein the base material is a plastic film.

3. The printed base material according to claim 1, wherein the printing face comprises a polyester resin.

4. The printed base material according to claim 1, wherein the printed area is ink-jetted.

5. The printed base material according to claim 1, wherein the printed area is defined by an aqueous ink.

6. The printed base material according to claim 1, wherein the printed area is defined by a color ink and a clear ink.

7. The printed base material according to claim 1, wherein the printed area is defined by an aqueous color ink and an aqueous clear ink.

8. The printed base material according to claim 1, wherein:
the printed area comprises a resin and a coloring agent; and
the resin is contained in an amount of 20% by mass or more relative to a total amount of the resin and the coloring agent.

9. The printed base material according to claim 1, wherein the clearance has a width of 10 μm to 1,500 μm.

10. The printed base material according to claim 1, wherein:
the different colors in the part of the differently colored printed area comprise a first color and a second color;
the first color or the second color has a width A (μm);
the width of the clearance in the part of the differently colored printed area is B (μm); and
a ratio of B/A is 8 or less.

11. The printed base material according to claim 1, wherein:
the different colors in the part of the differently colored printed area comprise a first color and a second color;
the first color or the second color has a width of 500 μm or less; and
the ratio of X/Y is 50 to 800.

12. The printed base material according to claim 11, wherein the width of the first color or the second color is 400 μm or less and the ratio of X/Y is 100 to 800.

13. The printed base material according to claim 1, wherein:
the different colors in the part of the differently colored printed area comprise a first color and a second color;
the first color or the second color has a width of more than 500 μm; and
the ratio of X/Y is 20 to 200.

14. The printed base material according to claim 13, wherein the width of the first color or the second color is 600 μm or more and the ratio of X/Y is 20 to 150.

15. The printed base material according to claim 1, wherein:
the different colors in a first part of the differently colored printed area comprise a first color and a second color;
the first color or the second color has a width of 500 μm or less;
the first part of the differently colored printed area has a printing resolution $X_1$ (dpi);
a number of pixels corresponding to a width of the clearance in the first part of the differently colored printed area is $Y_1$;
a ratio of $X_1/Y_1$ is 50 or more;
the different colors in a second part of the differently colored printed area comprise a third color and a fourth color;
the third color or the fourth color has a width of more than 500 μm;

the second part of the differently colored printed area has a printing resolution $X_2$ (dpi);
a number of pixels corresponding to a width of the clearance in the second part of the differently colored printed area is $Y_2$; and
a ratio of $X_2/Y_2$ is 200 or less.

16. The printed base material according to claim 1, wherein the different colors in the part of the differently colored printed area contain a white color.

17. The printed base material according to claim 1, wherein:
the different colors in the part of the differently colored printed area comprise a first color and a second color;
the first color is in a pattern; and
the second color is a background.

18. The printed base material according to claim 1, wherein:
the different colors in the part of the differently colored printed area comprise a first color and a second color;
the first color defines a bar code or a two-dimensional code;
the second color is a background; and
the part of the differently colored printed area is readable as the bar code or the two-dimensional code.

19. A method for producing the printed base material according to claim 1, the method comprising:
printing the printed area on the base material,
wherein the differently colored printed area is printed while providing the clearance between the different colors.

20. A method for reducing or preventing bleeding between different colors adjacently printed in a differently colored printed area comprised in a printed area on a printed base material, the method comprising:
printing the printed area on a base material,
wherein:
the differently colored printed area is printed while providing a clearance between the different colors;
the base material comprises a printing face having a wetting tension of 30 dyn/cm to 50 dyn/cm;
the differently colored printed area has a printing resolution X (dpi);
a number of pixels corresponding to a width of the clearance is Y; and
a ratio of X/Y is 20 to 800.

21. The method according to claim 19, wherein the printing is performed by ink-jetting.

22. The method according to claim 19, wherein the printing is performed by ejecting a color ink and a clear ink.

23. The method according to claim 19, wherein the width of the clearance is 10 μm to 1,500 μm.

24. The method according to claim 19, wherein:
the different colors comprise a first color and a second color;
the first color or the second color has a width A (μm);
the width of the clearance is B (μm); and
a ratio of B/A is 8 or less.

25. A molded article comprising the printed base material according to claim 1.

26. The molded article according to claim 25, wherein the molded article is a bag for medical use.

* * * * *